US012172733B2

(12) United States Patent
Hartvigsen

(10) Patent No.: US 12,172,733 B2
(45) Date of Patent: Dec. 24, 2024

(54) APPARATUS FOR LAUNCH AND RECOVERY OF A SUBMERSIBLE VESSEL FROM AND TO AN OFF-SHORE SITE

(71) Applicant: Harco ApS, Tjæreborg (DK)

(72) Inventor: Søren Bach Hartvigsen, Tjæreborg (DK)

(73) Assignee: ARCIM APS, Esbjerg (DK)

( * ) Notice: Subject to any disclaimer, the term of this patent is extended or adjusted under 35 U.S.C. 154(b) by 465 days.

(21) Appl. No.: 17/440,818

(22) PCT Filed: Mar. 20, 2020

(86) PCT No.: PCT/DK2020/050074
§ 371 (c)(1),
(2) Date: Sep. 20, 2021

(87) PCT Pub. No.: WO2020/187381
PCT Pub. Date: Sep. 24, 2020

(65) Prior Publication Data
US 2022/0185434 A1 Jun. 16, 2022

(30) Foreign Application Priority Data
Mar. 20, 2019 (DK) ........................... PA 2019 70175

(51) Int. Cl.
*B63B 27/16* (2006.01)
*B63B 27/36* (2006.01)
(Continued)

(52) U.S. Cl.
CPC .............. *B63B 27/16* (2013.01); *B63B 27/36* (2013.01); *B66C 13/02* (2013.01); *B66C 13/063* (2013.01);
(Continued)

(58) Field of Classification Search
CPC .................... B63B 27/16; B63B 27/36; B63B 2027/165; B63B 13/02; B63B 13/063; B63B 13/08; B63B 23/52; B63B 39/00; B63J 2003/002
(Continued)

(56) References Cited

U.S. PATENT DOCUMENTS 3,955,522 A * 5/1976 Gaudiano ............... B63B 27/36 114/259
4,662,300 A 5/1987 McCallum
4,883,184 A 11/1989 Albus
7,040,680 B2 * 5/2006 Grinsted ................. B66C 13/06 414/142.8
(Continued)

FOREIGN PATENT DOCUMENTS

CN 101357738 A 2/2009
CN 102659028 A 9/2012
(Continued)

OTHER PUBLICATIONS

Annex to the Communication from European Patent App. No. 20718142.1 (Jun. 26, 2024).

*Primary Examiner* — Daniel V Venne
(74) *Attorney, Agent, or Firm* — Cermak & McGowan LLP; James Creighton Wray; Malcolm K. McGowan

(57) ABSTRACT

The invention relates to an apparatus for launch and recovery a submersible vessel from and to an off-shore site. The apparatus comprises an actively operated gimbal coupled between said first end of the launch/recovery cable and the submersible vessel, when the submersible vessel is suspended by the launch/recovery cable. Both the displacement unit and the winch are operated by electrical motors during displacement of the displacement unit and during winding of the launch/recovery cable. Electrical power for the electrical motors is provided by batteries of the apparatus.

11 Claims, 3 Drawing Sheets

(51) Int. Cl.

| | |
|---|---|
| ***B63J 3/00*** | (2006.01) |
| ***B66C 13/02*** | (2006.01) |
| ***B66C 13/06*** | (2006.01) |
| ***B66C 13/08*** | (2006.01) |
| ***B66C 23/52*** | (2006.01) |

(52) U.S. Cl.
CPC .............. *B66C 13/08* (2013.01); *B66C 23/52* (2013.01); *B63B 2027/165* (2013.01); *B63J 2003/002* (2013.01)

(58) Field of Classification Search
USPC ..................... 114/258, 259, 312, 313, 50, 51
See application file for complete search history.

(56) References Cited

U.S. PATENT DOCUMENTS

| | | | |
|---|---|---|---|
| 2003/0026676 | A1 | 2/2003 | Grinsted |
| 2014/0377004 | A1 | 12/2014 | Lossec |
| 2018/0222727 | A1 | 8/2018 | Manchester |
| 2019/0077641 | A1 | 3/2019 | Stensland |

FOREIGN PATENT DOCUMENTS

| | | | |
|---|---|---|---|
| CN | 207466911 | U | 6/2018 |
| EP | 3000716 | A1 | 3/2016 |
| GB | 1250404 | A | 10/1971 |
| GB | 2537096 | A | 10/2016 |
| KR | 10-1366516 | B1 | 2/2014 |
| SU | 366116 | A1 | 1/1973 |
| WO | 2012053897 | A2 | 4/2012 |

* cited by examiner

APPARATUS FOR LAUNCH AND RECOVERY OF A SUBMERSIBLE VESSEL FROM AND TO AN OFF-SHORE SITE

This application claims the benefit of Danish Application No. PA 2019 70175 filed Mar. 20, 2019 and PCT/DK2020/050074 filed Mar. 20, 2020, International Publication No. WO 2020/187381 A1, which are hereby incorporated by reference in their entirety as if fully set forth herein.

FIELD OF THE INVENTION

The present invention relates to an apparatus for launch and recovery of a submersible vessel from and to an off-shore site, such as an off-shore site, the apparatus comprising: a support platform placed on off-shore site and a gantry pivotally mounted to the support platform and having side supports and a top beam suspended between the side supports of the gantry, a displacement unit for selectively displacing the gantry from an in-board position within boundaries of the off-shore site to an outboard position outside boundaries of the off-shore site, a launch/recovery cable passing said gantry and having a first end for suspending the submersible vessel from the off-shore site, when the submersible vessel is launched and recovered, a winch coupled to a second end of the launch/recovery cable, the winch operably to unwind and wind the hoist line when launch and recovery the submersible vessel, respectively. Especially, the invention relates to launch and recovery of a submersible vessel by use of a so-called A-frame on a platform, on a ship.

BACKGROUND OF THE INVENTION

Launch and recovery of a submersible vessel from and to an off-shore site, often a ship, is performed by a crane on the ship, capable of reaching outside a rail of the ship.

The crane may be a boom crane with telescopically extending booms, telescoping of the booms operated by hydraulics to extend or retract the booms of the crane. The crane may also be a jib crane with jibs pivoting in relation to an upright pillar, jibbing of the jib also operated hydraulically. The crane may also be a lattice crane with lattice booms pivoting in relation to each other, pivoting of the booms also operated hydraulically.

The crane may also be an A-frame crane with a gantry pivoting between an in-board position inside a ship's rail and an out-board position outside a ship's rail, pivoting of the gantry also performed by hydraulics. The out-board position is the position for launching into the sea and recovering the submersible vessel from the sea. The inboard position is the position for storing the submersible vessel on the ship.

Operating the booms, the jibs or the gantry by hydraulics has the advantage that it is possible to obtain necessary power to launch and to recover the submersible vessel by merely dimensioning the hydraulic system to the needs for power. Various hydraulic systems are readily available. However, hydraulic systems also have disadvantages not recognized.

Hydraulic system and engines operating the hydraulic systems are providing much noise and are polluting the immediate surroundings, both annoying to personnel on the ship.

Hydraulic systems may also, over time or suddenly, spill oil on the deck of the ship and into the sea, making the deck slippery to personnel on the ship and polluting the sea.

Power consumption is high on a hydraulic system because the efficiency is poor and a hydraulic pumping unit of the hydraulic system is running throughout the entire operation of the submersible vessel, also when the submersible vessel is launched into the sea, for constantly backfilling of the hydraulic system, being ready for pressure capacity at all time during the operation, and even though the hydraulic system from time to time, as example during launch of the submersible vessel, may not be needed.

The apparatus for launch and recovery of a submersible vessel is often provided with roll compensating hydraulic pistons and/or pitch compensating hydraulic motors and possibly also with a latch box operated by hydraulics, these elements of the apparatus is positioned outside the side of the off-shore site during operation of the submersible vessel. Any hydraulic oil spill from these elements is spilled directly into the sea.

OBJECT OF THE INVENTION

It is an object of the present invention to provide an apparatus eliminating the disadvantages of existing cranes for launch and recovery a submersible vessel from and to a ship.

DESCRIPTION OF THE INVENTION

The object of the invention may be obtained, according to a first aspect of the invention, by an apparatus comprising

- an actively operated gimbal coupled between said first end of the launch/recovery cable and the submersible vessel, when the submersible vessel is suspended by the launch/recovery cable,
- actuators provided between the actively operated gimbal and the submersible vessel, the actuators operably for displacing the submersible vessel in relation to the actively operated gimbal in order to maintain the submersible vessel in a selected position in relation to the actively operated gimbal and in order to stabilize a position of the submersible vessel in relation to the off-shore site, when being launched and recovered,
- the actuators being electrically operated actuators, and the apparatus comprising batteries for providing electrical power to the electrically operated actuators.

The actuators being operated by electricity and not by hydraulic fluid, have the advantage, that it is possible only to use energy for operation of the actuators, when the actuators are actually operating. Contrary hereto, hydraulic systems needs to be continuously powered, also when hydraulic cylinders are not operating, because it takes time building up pressure in a hydraulic system, such pressure possibility suddenly needed.

Also, any risk of spilling hydraulic fluid on the deck of the ship and/or into the sea is eliminated. Risk of injuries of personnel is eliminated if caused by slipping in hydraulic. Risk of polluting the sea with hydraulic fluid is eliminated, and the risk of being fined because of spilling hydraulic fluid into the sea is also avoided. Furthermore, noise from machinery operating hydraulic pumps is avoided, to the benefit of personnel on board the ship.

According to one possible embodiment of the invention, the apparatus has roll actuators provided between the gantry and actively operated gimbal, said roll actuators intended for and capable of stabilizing movement of the submersible vessel when suspended in the gantry, the stabilizing of movement being towards roll movements of the off-shore site.

Roll actuators being electrically operated has the same advantages as mentioned above. Also, operation of the actuators may be faster, and operation of the roll actuators may also be more precise, because of electrical motors being easier and faster to control than hydraulic motors and hydraulic valves, possibly with leaks from hydraulic couplings.

The apparatus for launch and recovery of a submersible vessel from and to an off-shore site comprising:

- a support platform placed on said off-shore site and a gantry pivotally mounted to the support platform said gantry having side supports and a top beam suspended between the side supports of the gantry,
- a displacement unit for selectively displacing the entire gantry or a part of the gantry from an in-board position within boundaries of the off-shore site to an out-board position outside boundaries of the off-shore site,
- a launch/recovery cable passing said gantry and having a first end for suspending the submersible vessel from the off-shore site, when the submersible vessel is launched and recovered,
- a winch coupled to a second end of the launch/recovery cable, the winch operably to unwind and wind the launch/recovery cable when launching and recovering the submersible vessel, respectively,
- an actively operated gimbal coupled between said first end of the launch/recovery cable and the submersible vessel, when the submersible vessel is suspended by the launch/recovery cable,
- actuators provided between the actively operated gimbal and the submersible vessel, the actuators operable for displacing the submersible vessel in relation to the actively operated gimbal in order to maintain the submersible vessel in a selected position in relation to the actively operated gimbal and in order to stabilize a position of the submersible vessel in relation to the off-shore site, when being launched and recovered, The actuators being electrically operated actuators and the apparatus comprising rechargeable batteries for providing electrical power to the electrically operated actuators.

An electrical system controlling handling means for launch and recovery of said submersible vessel from/to an off-shore site, and charging means for charging the chargeable battery.

According to another possible embodiment of the invention, the apparatus has pitch actuators provided between the gantry and actively operated gimbal, said roll actuators intended for and capable of stabilizing movement of the submersible vessel when suspended in the gantry, the stabilizing of movement being towards pitch movements of the off-shore site.

Pitch actuators being electrically operated has the same advantages as mentioned above. Also, operation of the actuators may be faster, and operation of the roll actuators may also be more precise, because of electrical motors being easier and faster to control than hydraulic motors and hydraulic valves, possibly with leaks from hydraulic couplings.

According to yet another possible embodiment of the invention, the apparatus has a ring gear provided between the gantry and a docking ballet, the ring gear having a gear wheel extending around a substantially vertical axis and operable by an electric motor intended for and capable of rotating the gear wheel around the vertical axis, and where the docking ballet is rotated around the vertical axis, when the ring gear is operated.

A ring gear being electrically operated has the same advantages as mentioned above. Also, operation of the ring gear may be faster, and operation of the roll actuators may also be more precise, because of electrical motors being easier and faster to control than hydraulic motors and hydraulic valves, possibly with leaks from hydraulic couplings.

According to yet another possible embodiment of the invention, biasing elements are provided between the actively operated gimbal and a snubber ring provided between the actively operated gimbal and the submersible vessel, said biasing elements intended for and capable of dampening movements of the submersible vessel when suspended from the gimbal and when in abutment with the snubber ring, said dampening of movements of the submersible vessel and the snubber ring being movements from the off-shore site rolling and/or the off-shore site heaving and/or the off-shore site pitching.

The object of the invention may, according to a second aspect of the invention, also be obtained by an apparatus with

- an actively operated gimbal coupled between said first end of the launch/recovery cable and the submersible vessel, when the submersible vessel is suspended by the launch/recovery cable,
- where both the displacement unit and the winch is operated by electrical motors during displacement of the displacement unit and during winding of the launch/recovery cable, and where electrical power for the electrical motors is provided by batteries of the apparatus.

Using any situation where a load, such as the submersible vessel being displaced, is displaced by gravitational force, rather than forced of the operational system of the crane, provides a possibility of regenerating power and energy to the operational system. The apparatus comprising rechargeable batteries for storing the regenerated power and energy using the charging means.

But, in hydraulic systems, if a load is applying a pressure force to the hydraulic fluid, the pressure force applied will be wasted as heat. However, in electrical systems, if a load is applying a mechanical torque to parts of the system, the torque may be applied to an axle of an electrical motor, and the force applied being used for generating electrical energy.

According to another possible embodiment of the second aspect of the invention,

- the batteries are capable of being charged by the electrical motor of the winch, where the electrical motor during passive rotation, compared to active rotation when operating as a motor, and when the motor axle is applied with a torque, is capable of generating electrical power, and
- the electrical motor, after initial launch of the submersible vessel and during downwards displacement of the submersible vessel into the sea, generates electrical power for charging the batteries by the submersible vessel dragging the launch/recovery cable, because of a submersible vessel displacing, by gravity, towards the seabed.

As mentioned above, any situation, where a load such as the submersible vessel is displaced by gravitational forces rather than by forces applied by the operating electrical system, the forces may be used for regenerating electrical energy for the batteries.

According to yet another possible embodiment of the second aspect of the invention, the batteries are capable of being charged by the electrical motor of the winch, where the electrical motor during passive rotation, compared to active rotation when operating as a motor, and when the motor axle is applied with a torque, is capable of generating electrical power, and the electrical motor, during upwards heaving of the off-shore site, generates electrical power for charging the batteries by the submersible vessel dragging the launch/recovery cable, because of a distance increasing between the submersible vessel in the sea and the off-shore site at sea level during upward heaving of the off-shore site, with the proviso of the submersible vessel maintaining position in the sea in relation to the seabed.

As mentioned above, any situation, where a load such as the submersible vessel is displaced by gravitational forces rather than by forces applied by the operating electrical system, the forces may be used for regenerating electrical energy for the batteries.

According to yet another possible embodiment of the second aspect of the invention, the batteries are capable of being charged by any electrical motor of any pitch actuators and/or roll actuators, during passive rotation of the electrical motor, compared to active rotation when operating as a motor, and when the motor axle is applied with a torque, where the motor is capable of generating electrical power, the electoral motors during launch of the submersible vessel from the gantry and until reaching sea level is stabilized by any of the actuators, stabilizing comprising the electrical motors of the actuators breaking movement of the gimbal, during which breaking of movement electrical power is generated for charging the batteries.

Roll actuators and pitch actuators operate during launch of the submersible vessel, before the submersible vessel reached sea level, and possible during recovery of the submersible vessel, when the submersible vessel has come out of the sea, to stabilize the submersible vessel form the pitch and roll of the off-shore site such as a ship. During operation, the actuators need to stabilize the submersible vessel both actively by being applied electrical power, but also passively, during which passive operation the electrical motors of the actuators function as brakes and generating electrical power.

According to yet another possible embodiment of the second aspect of the invention, the rechargeable batteries are capable of being charged by charging means. The charging means may be an external main source, where the main source may be located on for example a ship. Alternatively, the charging means may collect electrical energy from every moveable part, which moves relative to the A-frame. The electrical energy is then transferred to the rechargeable battery. The moveable parts may be one or more of following parts: a gimbal, a winch, actuators, an axel of the motor, a screw conveyor etc.

The object of the invention may also be obtained by an off-shore site being a ship with an apparatus according to any of the apparatus embodiments mentioned above. The invention has now been explained with reference to a few embodiments which have only been discussed in order to illustrate the many possibilities and varying design possibilities achievable with the apparatus for launch and recovery of a submersible vessel from and to an off-shore site according to the present invention.

DESCRIPTION OF THE DRAWING

The embodiments of the invention are described in the following with reference to.

DETAILED DESCRIPTION OF THE INVENTION

Figure 1:
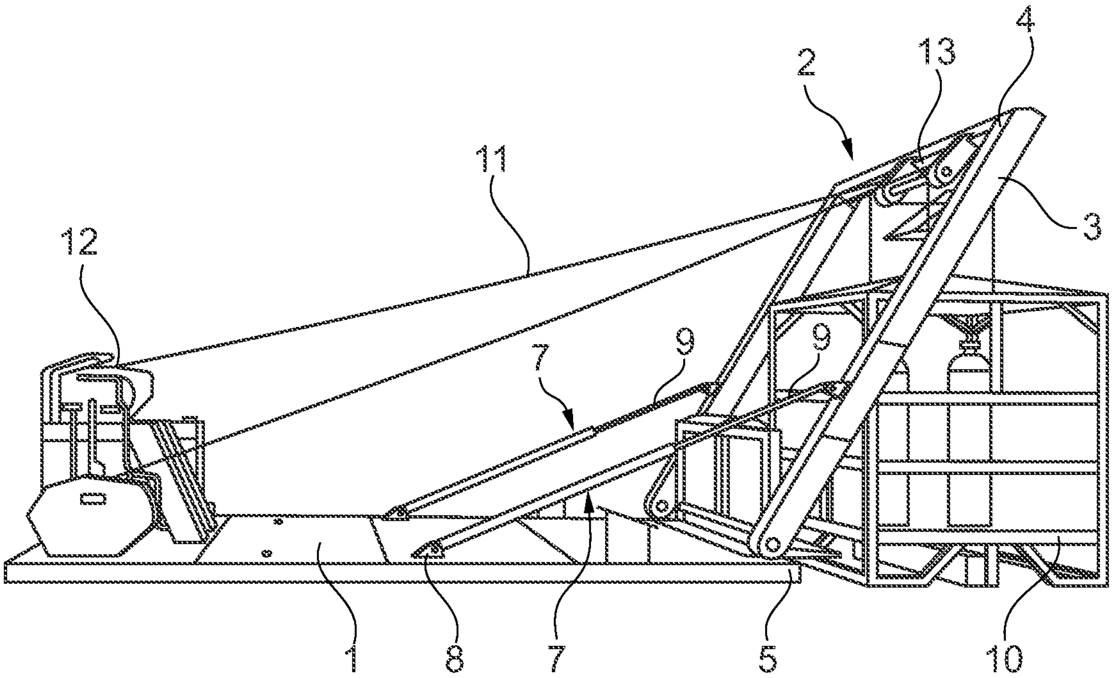
FIG. 1 is a drawing of a possible embodiment of an apparatus according to any first or second aspect of the invention.

An embodiment of the invention is explained in the following detailed description. It is to be understood that the invention is not limited in its scope to the following description or illustrated in the drawings. The invention is capable of other embodiments and of being practiced or carried out in various ways.

FIG. 1 is a drawing of an apparatus with a crane configured as a so-called A-frame. The crane has a support platform 1 and a gantry 2 with side supports 3 and a top beam 4. The crane is intended for being placed on an off-shore site, preferably placed on a ship. The gantry 2 is displaceable between a position being in-board in relation to boundaries of a ship and a position being out-board, as shown, in relation to boundaries of the ship.

Displacement is a pivoting movement of the gantry 2 around support bearings 5 at a bottom of each side support. Displacement of the gantry 2 between the in-board position and the out-board position, and vice versa, is provided by electrical motors (not shown) of electrical actuators 7 mounted at one end 8 to the platform 1 and with a spindle 9 mounted to the side supports 3 of the gantry 2 and pushing and pulling the gantry 2 between the positions, when the electrical actuators 7 are operated.

A submersible vessel 10 is hanging between the side supports 3 of the gantry 2. The submersible vessel 10 is intended for being launched by lowering the submersible vessel 10 into the sea along the side or along the stern of the ship. Launching of the submersible vessel 10 into the sea is performed by allowing a launch/recovery cable 11, at which the submersible vessel 10 is suspended, to unwind from a cable trolley 12 operated by an electric motor. When the submersible vessel 10 has been launched into the sea, and has performed in-sea tasks as intended, the submersible vessel 10 is to be recovered out of the sea again. Recovering the submersible vessel 10 out of the sea is performed by activating the launch/recovery cable 11, at which the submersible vessel 10 is suspended, to wind onto the winch 12 operated by the electric motor.

The launch/recovery cable 11 is rolling along a sheave 13 provided at the top beam of the gantry 2. When the launch/recovery cable 11 is allowed passively unwinding during launch of the submersible vessel 10, and the cable winch 12 is allowed to passively rob along with the launch/recovery cable 11 by the submersible vessel 10 launching into the sea towards the seabed, away from the gantry 2. When the launch/recovery cable 11 is activated and winding during recovery of the submersible vessel 10, the cable winch 12 is rolling along with the cable 11, dragging the submersible vessel 10 through the sea, towards the surface of the sea, towards the gantry 2.

When launching the submersible vessel 10, the launch/recovery cable 11 and the cable winch 12 is being dragged and rotated, respectively, by the submersible vessel 10 sinking into the sea. Launching of the submersible vessel 10 into the sea is obtained by the potential energy of the submersible vessel 10 decreasing. The potential energy of the submersible vessel 10 decreasing is converted to kinetic energy of the cable winch 12, the kinetic energy being rotation of the cable winch 12. An axle of an electrical motor is coupled to a rotational axle of the cable winch 12. Rotation of the cable winch 12, when the submersible vessel 10 is being launched, may be converted into electrical energy. The electrical energy may be used to charge electrical batteries. No external power, only gravitational power, is needed for launching the sub. Thus, the gravitational energy may be converted into electrical energy charging batteries to operate the apparatus, when needed.

Figure 2:
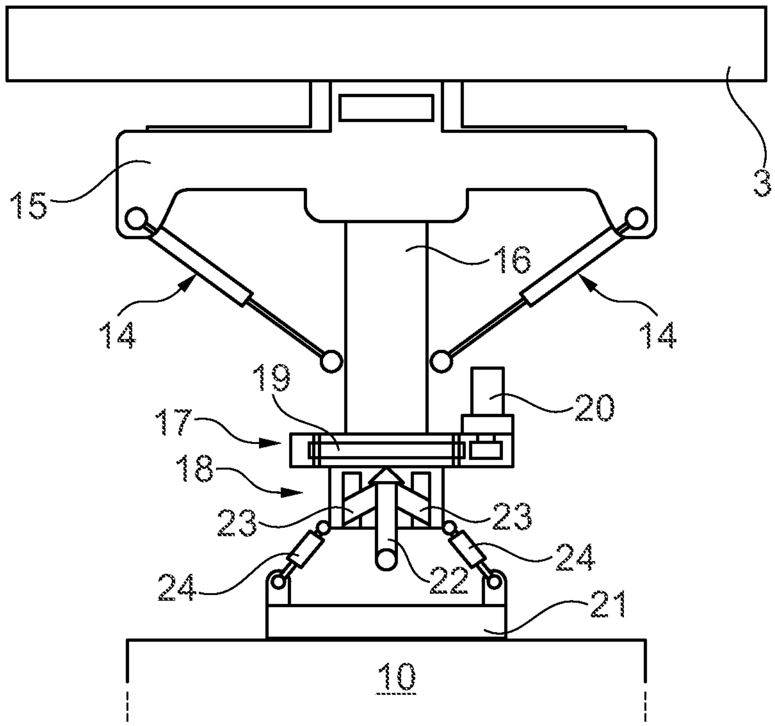
FIG. 2 is a sketch of a possible embodiment of an actively operated gimbal of an apparatus according to the invention.

FIG. 2 is a sketch showing a possible embodiment of an actively operated gimbal for an apparatus. The actively operated gimbal is suspended in the launch/recovery cable (see FIG. 1) within the side supports (see FIG. 1) and the top beam of the gantry (see FIG. 1).

The actively operated gimbal is provided intermediate the launch/recovery cable and the submersible vessel. The actively operated gimbal is intended for supporting and controlling movement of the sub, when suspended in the launch/recovery cable and when pivoting the gantry between the in-board position and the out-board position, and vice versa. If the submersible vessel 10 is just suspended in the launch/recovery cable, movements of the ship would make movements of the submersible vessel 10 uncontrollable and could lead to damages to the sub, to the gantry, to the ship and possibly also lead to injuries to people operating the apparatus.

Movements of the ship may be heaving, which is upwards and downwards movements of the ship, and/or pitching, which is lengthwise movements around transversal axes of the ship, and/or rolling, which is transverse movements around lengthwise axes of the ship.

The actively operated gimbal has roll actuators 14 provided between a lathe 15 and a support strut 16 of the actively operated gimbal. The roll actuators 14 are electrical actuators with a spindle extending from a casing of an electrical motor (not shown) operating the spindle. The roll actuators 14 are operable to control movements of the submersible 10 vessel in depending on rolling movements of the ship. Pitch actuators are provided between the gantry and the actively operated gimbal (see FIG. 5).

The actively operated gimbal also has a ring gear 17 provided between the support strut 16 and a latch box 18. The ring gear 17 is electrical and has a gear wheel 19 capable of rotating around a vertical axis. The gear wheel is operated by an electrical motor 20. The gear wheel 19 is operable to control rotational alignment of the submersible vessel 10 around the vertical axis. Rotation of the submersible vessel 10 around the vertical axis may be necessary for the submersible vessel 10 to be aligned between the side support of the gantry during launch and during recovery of the sub, when the gantry with the submersible vessel 10 supported between the side supports is pivoted from an in-board position to an out-board position, and vice versa.

The actively operated gimbal also has a latch box 18 provided between the ring gear 17 and a snubber ring 21. The latch box 18 is intended for supporting the submersible vessel 10 and latching the submersible vessel 10 to the actively operated gimbal, when the submersible vessel 10 is fully recovered towards the actively operated gimbal. By providing a latch box 18, the launch/recovery cable need not hold the weight of the submersible vessel 10, when the submersible vessel 10 is fully recovered, during transport between various sites for use of the submersible vessel 10. The latch box 18 is operated so that a docking ballet 22, with a dove-tail shape at a top, is latched between gripping jaws 23 of the latch box 18. The gripping jaws 23 of the latch box 19 may be released by electrical operators (not shown) releasing the grip of the griping jaws 23 around the dove-tail shaped top of the docking ballet 22.

Biasing elements 24 are provided between the latch box 18 and the snubber ring 21. The snubber ring 21 is intended for abutting a top surface of the submersible vessel, when the submersible vessel 10 is fully recovered, in order to provide a support surface for the submersible vessel 10 towards the actively operated gimbal. The biasing elements 24 are passive and are intended for limiting any swaying of the submersible vessel 10 and the snubber ring 21 when suspended to the latch box 18. The biasing elements 24 may be telescopic cylinders with an outer housing and a piston extending from the outer housing. A biasing element (not shown) is positioned inside the outer housing and is biasing the piston outwards in relation to the outer housing.

Figure 3:
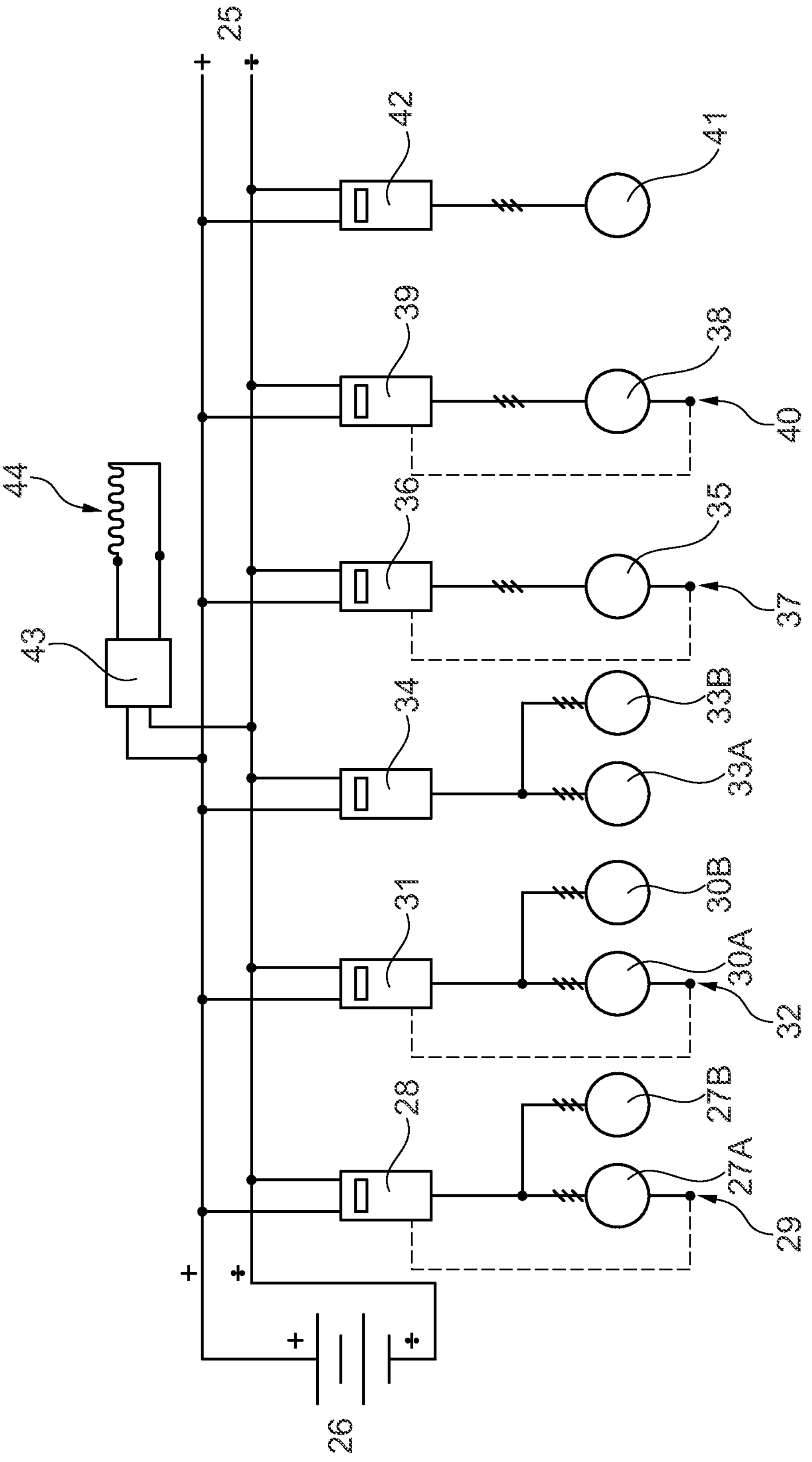
FIG. 3 is a possible layout of an electrical circuit for, or being part of, an apparatus according to the invention.

FIG. 3 is a sketch of a possible layout of an electrical system for an apparatus for launch and recovery of a submersible vessel from/to an off-shore site such as a ship.

A DC BUS 25 constitutes a basic part of the electrical system. A battery supply 26 is coupled as part of the DC BUS 25. The battery supply is chargeable by electrical motors used as electrical generators, if a torque is applied to an axle of the electrical motors.

Electrical motors 27A,27B for a number of roll actuators (see FIG. 2), as example two, are coupled to the DC BUS 25 via an inverter 28 for the electrical roll motors 27A,27B. An encoder 29 is provided for closed loop vector control of the electrical roll motors 27A,27B and for zero speed setting of the electrical roll motors 27A,27B. Depending on the torque settings, the electrical roll motors 27A,27B, if not operated actively during appliance of electrical power to the electrical roll motors 27A,27B, the electrical roll motors 27A,27B perform dampening of the gimbal (see FIG. 2), thereby charging the battery supply 26.

Electrical motors 30A,30B for a number of pitch actuators (see FIG. 2), as example two, are coupled to the DC BUS 25 via an inverter 31 for the electrical pitch motors 30A,30B. An encoder 32 is provided for closed loop vector control of the electrical pitch motors 30A,30B and for zero speed setting of the electrical pitch motors 30A,30B. Depending on the torque settings, the electrical pitch motors 30A,30B, if not operated actively during appliance of electrical power to the electrical pitch motors 30A,30B, the electrical pitch motors 30A,30B perform dampening of the gimbal (see FIG. 2), thereby charging the battery supply 26.

Electrical motors 33A,33B for a number of luffing actuators (see FIG. 2), as example two, are coupled to the DC BUS 25 via an inverter 34 for the electrical luffing motors 33A,33B. Depending on the torque settings, the electrical luffing motors 33A,33B, if not operated actively during appliance of electrical power to the electrical luffing motors 33A,33B, the electrical luffing motors 33A,33B perform dampening of the gimbal (see FIG. 2), thereby charging the battery supply 26.

An electrical motor 35 for a docking ballet (see FIG. 2) rotation actuator is coupled to the DC BUS 25 via an inverter 36 for the electrical docking ballet motor 36. An encoder 37 is provided for closed loop vector control of the electrical docking ballet motor 35 and for zero speed setting of the electrical docking ballet motor 35. Depending on the torque settings, the electrical docking ballet motor 35, if not operated actively during appliance of electrical power to the electrical docking ballet motor 35, the electrical docking ballet motor 35 perform dampening of the gimbal (see FIG. 2), thereby charging the battery supply 26.

An electrical motor 38 for a gimbal (see FIG. 2) is coupled to the DC BUS 25 via an inverter 39 for the electrical gimbal lock motor 38. An encoder 40 is provided for closed loop vector control of the electrical gimbal lock motor 38 and for zero speed setting of the electrical gimbal lock motor 38. Depending on the torque settings, the electrical gimbal lock motor 38, if not operated actively, by appliance of electrical power to the electrical gimbal lock motor 38, the electrical gimbal lock motor 38 perform dampening of the gimbal (see FIG. 2), thereby charging the battery supply 26.

An electrical motor 41 for a winch drive (see FIG. 1) is coupled to the DC BUS 25 via an inverter 42 for the electrical winch drive motor 41. The winch drive is reeling out and reeling in the launch/recovery cable during launch and recovery, respectively, of the submersible vessel (see FIG. 1 and FIG. 2). The electrical winch drive motor 41, if not operated actively during appliance of electrical power to the electrical winch drive motor 41, the electrical winch drive motor 41 allows reeling out of the launch/recovery cable, thereby charging the battery supply 26.

The electrical system is also provided with an electrical surcharge prevention coupled to the DC BUS 25 25. The electrical surcharge prevention comprises a brake chopper 43 coupled to an electrical resistor element 44. Electrical surcharge is prevented by electrical power being supplied to the electrical resistor element 44. The surcharge electrical power is released as heat in the electrical resistor element 44. The brake chopper 43 controls when surcharge electrical energy is applied to the electrical resistor element 43.

Operation of the apparatus is as follows. Intially, the submersible vessel is situated on the platform of the apparatus the gantry is pivoted to an in-board position inside boundaries of the ship at which the apparatus is situated. When the submersible vessel is to be used subsea at a given location of the ship, and for a given purpose, the gantry is pivoted from the in-board position to the out-board position, so that the submersible vessel is situated outside the boundaries of the ship, ready to be launched into the sea.

The ring gear ensures that the submersible vessel is orientated around a vertical axis in such a manner, that the submersible vessel is situated between the side supports of the gantry during pivoting of the gantry, without the submersible vessel colliding with the side supports of the gantry. Pivoting of the gantry is performed by electrical actuators, powered by batteries, the electrical actuators forcing the gantry to pivot from the inboard position to the out-board position during launch, or vice versa during recovery.

Subsequently, the submersible vessel is allowed to launch, by gravitational force, into the sea and toward the seabed. During launch of the submersible vessel towards the seabed, the launch/recovery cable is allowed to passively unwind from the cable trolley, and the cable winch is allowed to passively rotate with the launch/recovery cable. An electrical motor, the axle of which is rotated by the cable winch, may be provided for, during launch of the submersible vessel towards the seabed, generating electrical energy to charge electrical batteries, using a decrease of potential energy of the submersible vessel to increase electrical energy of the electrical batteries, by being charged by the electrical motor.

When the submersible vessel in position in the sea, in a position between the sea surface and the seabed, or at the sea surface or at the seabed, the position of the submersible vessel often must be maintained even though the ship to which the submersible vessel is attached, is heaving, pitching and/or rolling. The apparatus is often capable of equalizing the rolling, heaving and pitching of the ship so that the movements are not transferred to the submersible vessel via the launch/recovery cable. During movement of the ship, active winding of the launch/recovery cable may be performed, but also passive unwinding of the launch/recovery cable may be performed. Any time passive unwinding of the launch/recovery cable is performed, an electrical motor coupled to the axle of the cable winch may generate further electrical energy for charging batteries.

Figure 4A:
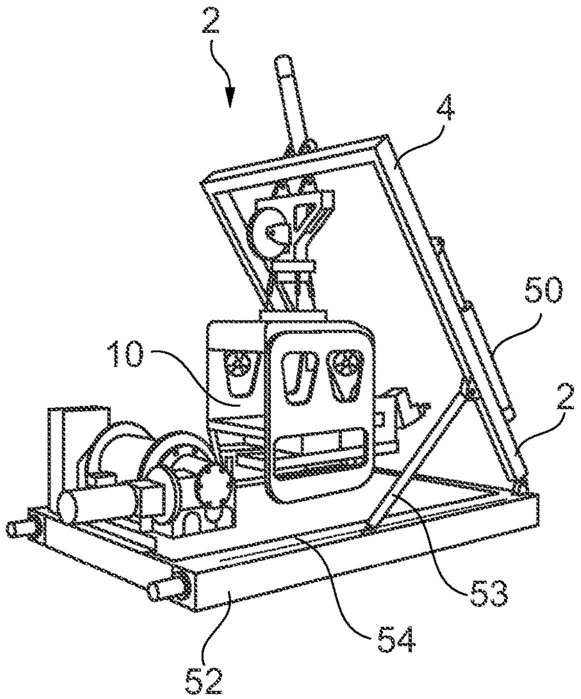
FIG. 4 *a,b* is a second possible embodiment of an apparatus arranged in an inboard position.
Figure 4B:
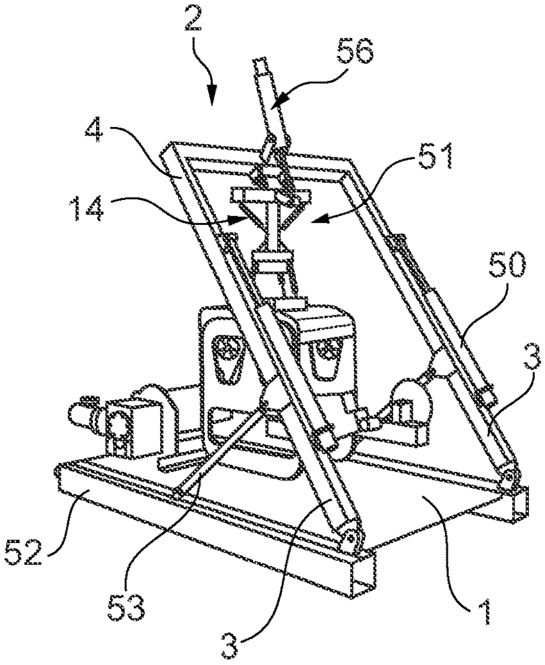

FIG. 4 *a,b* is a second possible embodiment of an apparatus arranged in an in-board position. The apparatus is viewed from a first and a second side view. The apparatus is provided with a crane also configured as a so-called A-frame. The crane has a support platform 1 and a gantry 2 with side supports 3 and a U-formed top beam 4. The U-formed top beam 4 can be displaced relative to the side supports 3 using electrical actuators 50. The gantry 2, which is showed in an in-board position, is displaceable between a position being in-board in relation to boundaries of a ship and a position being out-board in relation to boundaries of a ship.

Displacement of the gantry 2 is a pivoting movement around support bearings 5 at a bottom of each side support 3. Displacement of the gantry 2 between the in-board position and the out-board position, and vice versa, is provided by electrical motors (not shown) driving the spindles arranged on each side of the platform 1. The spindle is arranged in an elongated housing 52, which has an opening 54 on the upper side of the housing along the platform 1. One end of a rod 53 is mounted to the side support 3 and the opposite end of the rod 53 is arranged through the opening 55 of the elongated housing 52 and the rod 53 is attached relative to the spindle. The rod 53 is moveable along the opening 54, so each of the spindles are capable of pushing or pulling the rod 53 back and forth and at the same time moving the gantry 2 from an inboard position to an outboard position.

A submersible vessel 10 is hanging between the side supports 3 of the gantry 2. The submersible vessel 10 is releasably connected to the gimbal 51. When launching the submersible vessel 10, the motor drives the spindle, so the spindle pushes the rods 53 towards the gantry 2, and at the same time moves the gantry 2 to an outboard position, where the submersible vessel 10 is free of the ship. The submersible vessel 10 is ready to be lowered into the sea. Roll actuators 14 and pitch actuators 56 operate during launch of the submersible vessel, before the submersible vessel reached sea level, to stabilize the submersible vessel 10 form the pitch and roll of the ship.

Figure 5:
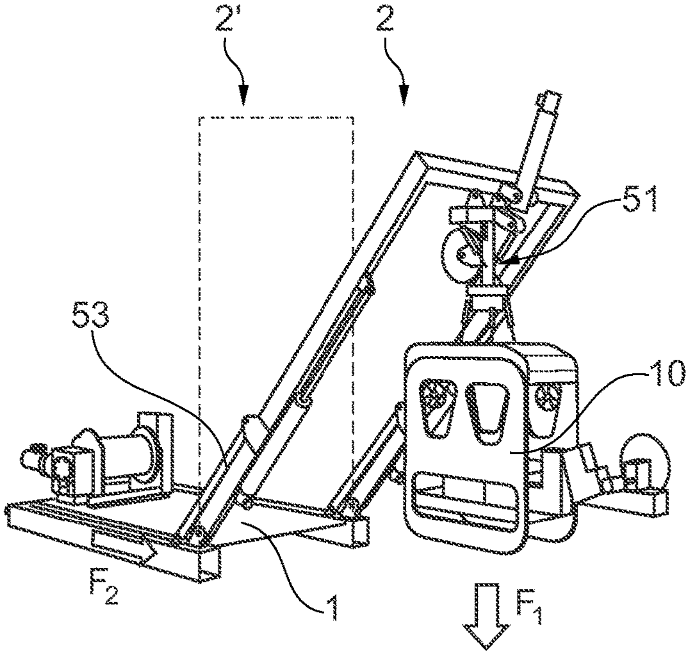
FIG. 5 is a second possible embodiment of an apparatus arranged in an outboard position.

FIG. 5 is a second possible embodiment of an apparatus arranged in an outboard position. The rechargeable battery stores the regenerated power and energy from the operation of the apparatus, by using the charging means. For example, the energy may be generated when the gantry 2 is being moved into an outboard position and passing an upright position 2'. The weight of the gantry 2, the gimbal 51 and the submersible vessel 10 will be forced downwards due to the gravity, illustrated by the arrow $F_1$. The rod will be pulled towards the side supports 3 by the outgoing movement of the gantry 2, illustrated by the arrow $F_2$. The rod will interact with the spindle and forcing the spindle to rotate. Then the spindle is in a passive operation, and the rotation of the spindle will generate electrical energy and thereby charge the batteries.

The same applies when moving the gantry 2 into an inboard position and passing an upright position 2', then the weight of the gantry 2, the gimbal 51 and the submersible vessel will be forced downwards towards the platform 1, due to the gravity. The rod will be pushed away from the side supports 3 by the movement of the gantry 2. The rod will interact with the spindle forcing the spindle to rotate. Then the spindle is in a passive operation, and the rotation of the spindle will generate electrical energy and thereby charge the batteries.

The invention claimed is:

1. An apparatus for launch and recovery of a submersible vessel from and to an off-shore site, the apparatus comprising:

a crane comprising a support platform placed on said off-shore site and a gantry pivotally mounted to the support platform, said gantry having side supports and a top beam suspended between the side supports of the gantry, a displacement unit for selectively displacing the gantry or a part of the gantry from an in-board position within boundaries of the off-shore site to an out-board position outside boundaries of the off-shore site, a launch/recovery cable passing said gantry and having a first end for suspending the submersible vessel from the off-shore site, when the submersible vessel is launched and recovered, a winch coupled to a second end of the launch/recovery cable, the winch operable for unwinding and winding the launch/recovery cable when launching and recovering the submersible vessel into or from a sea, respectively, an actively operated gimbal coupled between said first end of the launch/recovery cable and the submersible vessel, when the submersible vessel is suspended by the launch/recovery cable, actuators provided between the actively operated gimbal and the submersible vessel, the actuators operable for displacing the submersible vessel in relation to the actively operated gimbal in order to maintain the submersible vessel in a selected position in relation to the actively operated gimbal and in order to stabilize a position of the submersible vessel in relation to the off-shore site, when being launched and recovered, the actuators being electrically operated actuators, and the apparatus comprising rechargeable batteries for providing electrical power to the electrically operated actuators an electrical system configured to control launch and recovery of said submersible vessel from/to an off-shore site, and to charge the rechargeable batteries, where the actuators comprise roll actuators provided between the gantry and the actively operate gimbal, said roll actuators intended for and capable of stabilizing movement of the submersible vessel when suspended in the gantry, the stabilizing of movement being towards roll movements of the off-shore site, and/or pitch actuators provided between the gantry and the actively operated gimbal, said pitch actuators intended for and capable of stabilizing movement of the submersible vessel when suspended in the gantry, the stabilizing of movement being towards pitch movements of the off-shore site.

2. An apparatus according to claim 1, where the apparatus has a ring gear provided between the gantry and a docking ballet, the ring gear having a gear wheel extending around a substantially vertical axis and operable by an electric motor intended for and capable of rotating the gear wheel around the vertical axis, and where the docking ballet is rotated around the vertical axis, when the ring gear is operated.

3. An apparatus according to claim 1, where biasing elements are provided between the actively operated gimbal and a snubber ring provided between the actively operated gimbal and the submersible vessel, said biasing elements intended for and capable of dampening movements of the submersible vessel when suspended from the actively operated gimbal and when in abutment with the snubber ring, said dampening of movements of the submersible vessel and the snubber ring being movements from the off-shore site rolling and/or the off-shore site heaving and/or the off-shore site pitching.

4. An apparatus according to claim 1, where said winch is operated by a motor axle of an electrical motor, and where the winch is coupled to a second end of the launch/recovery cable, the winch operable to unwind and wind the launch/recovery cable when launching and recovering the submersible vessel, respectively, where both the displacement unit and the winch is operated by electrical motors during displacement of the displacement unit and during winding of the launch/recovery cable, and where electrical power for the electrical motors are provided by batteries of the apparatus.

5. An apparatus according to claim 4, where the batteries are capable of being charged by the electrical motor of the winch, where the electrical motor during passive rotation, compared to active rotation when operating as a motor, and when the motor axle is applied with a torque, is capable of generating electrical power, and where the electrical motor, after initial launch of the submersible vessel and during downwards displacement of the submersible vessel into the sea, generates electrical power for charging the batteries by the submersible vessel dragging the launch/recovery cable, because of the submersible vessel displacing, by gravity, towards a seabed.

6. An apparatus according to claim 4, where the batteries are capable of being charged by the electrical motor of the winch, where the electrical motor during passive rotation, compared to active rotation when operating as a motor, and when the motor axle is applied with a torque, is capable of generating electrical power, and where the electrical motor, during upwards heaving of the off-shore site, generates electrical power for charging the batteries by the submersible vessel dragging the launch/recovery cable thereby unwinding the launch/recovery cable, because of a distance increasing between the submersible vessel in the sea and the off-shore site at sea level during upward heaving of the off-shore site, while the submersible vessel maintains position in the sea in relation to a seabed.

7. An apparatus according to claim 4, where the batteries are capable of being charged by any electrical motor and/or of any pitch actuators and/or roll actuators, during passive rotation of the electrical motor, compared to active rotation when operating as a motor, and when the motor axle is applied with a torque, where the motor is capable of generating electrical power, where the electrical motors during launch of the submersible vessel from the gantry and until reaching sea level is stabilized by any of the actuators, stabilizing comprising the electrical motors of the actuators breaking movement of the actively operated gimbal, during which breaking of movement electrical power is generated for charging the batteries.

8. An off-shore site being a ship with an apparatus according claim 1.

9. An apparatus according to claim 1, where the part of the gantry comprises one or more of the actively operated gimbal, the winch, the actuators, an axle of a motor, or a screw conveyor.

10. An apparatus according to claim 1, where the displacement unit comprises electrically operated actuators provided between the gantry and the support platform.

11. An apparatus according to claim 1, where the top beam is displaceable relative to the side supports using electrically operated actuators, wherein electrically operated actuators provided between the top beam and the side supports.

* * * * *